US008576573B2

(12) United States Patent
Tani

(10) Patent No.: US 8,576,573 B2
(45) Date of Patent: Nov. 5, 2013

(54) CONTROLLER, ELECTRIC POWER STEERING PROVIDED WITH THE SAME, METHOD OF MANUFACTURING BUS BAR, AND METHOD OF MANUFACTURING CONTROLLER

(75) Inventor: Naoki Tani, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 252 days.

(21) Appl. No.: 13/077,180

(22) Filed: Mar. 31, 2011

(65) Prior Publication Data
US 2011/0242773 A1 Oct. 6, 2011

(30) Foreign Application Priority Data

Apr. 2, 2010 (JP) ................................. 2010-086251

(51) Int. Cl.
*H05K 5/00* (2006.01)
*H02K 7/116* (2006.01)
(52) U.S. Cl.
CPC .................................... *H02K 7/1166* (2013.01)
USPC .......................................... 361/752; 361/775
(58) Field of Classification Search
CPC .......................... H02K 7/1166; H02K 11/0073
USPC .......................... 361/748, 751, 752, 775, 688; 174/149 B, 250; 29/592.1, 844
See application file for complete search history.

(56) References Cited

U.S. PATENT DOCUMENTS

| | | | |
|---|---|---|---|
| 6,884,953 B2 * | 4/2005 | Nii et al. ........................ | 200/294 |
| 2001/0021103 A1 * | 9/2001 | Takagi ........................... | 361/752 |
| 2003/0173920 A1 * | 9/2003 | Tominaga et al. ............. | 318/432 |
| 2008/0277189 A1 * | 11/2008 | Kanda et al. .................. | 180/443 |
| 2009/0236321 A1 * | 9/2009 | Hayashi et al. ........... | 219/121.64 |

FOREIGN PATENT DOCUMENTS

| | | |
|---|---|---|
| JP | A-2000-083311 | 3/2000 |
| JP | A-2009-188123 | 8/2009 |
| JP | A-2009-247139 | 10/2009 |

* cited by examiner

*Primary Examiner* — Yuriy Semenenko
(74) *Attorney, Agent, or Firm* — Oliff & Berridge, PLC

(57) ABSTRACT

A controller includes: a circuit board; a retaining member; a bus bar that has an embedded portion embedded in and retained by the retaining member and an exposed portion that is exposed from the retaining member and that is electrically connected to the circuit board; and an electrical element that has a terminal connected to the exposed portion. The bus bar is formed in such a manner that a metal plate of which an outer surface is plated with a plating layer is cut along a predetermined cutting plane. The cutting plane at the exposed portion has a parallel portion that is arranged substantially parallel to a principal surface of the circuit board. The parallel portion and the terminal are joined to each other.

8 Claims, 10 Drawing Sheets

CONTROLLER, ELECTRIC POWER STEERING PROVIDED WITH THE SAME, METHOD OF MANUFACTURING BUS BAR, AND METHOD OF MANUFACTURING CONTROLLER

INCORPORATION BY REFERENCE

The disclosure of Japanese Patent Application No. 2010-086251 filed on Apr. 2, 2010 including the specification, drawings and abstract is incorporated herein by reference in its entirety.

BACKGROUND OF THE INVENTION

1. Field of the Invention

The invention relates to a controller, an electric power steering provided with the controller, a method of manufacturing bus bar, and method of manufacturing the controller.

2. Description of Related Art

For example, an electric power steering equipped with a steering assist electric motor includes a controller that controls the electric motor (for example, see Japanese Patent Application Publication No. 2009-188123 (JP-A-2009-188123) and Japanese Patent Application Publication No. 2009-247139 (JP-A-2009-247139)). The controller includes a power board that feeds driving electric power to the electric motor. A metal bus bar is connected to the power board. The bus bar is, for example, fixed between stacked plates as described in Japanese Patent Application Publication No. 2000-83311 (JP-A-2000-83311).

The bus bar described in JP-A-2009-247139 includes a first bus bar and a second bus bar. The first bus bar and the second bus bar are joined to each other by TIG welding. The first bus bar has a nickel plating layer. The nickel plating layer is connected to the electrode of the power board by wire bonding. In addition, the second bus bar has a tin plating layer. The terminal of a capacitor is joined to the tin plating layer by resistance welding.

In JP-A-2009-247139, as described above, the first bus bar suitable for wire bonding and the second bus bar not suitable for wire bonding but suitable for resistance welding are used. However, two types of bus bars, that is, the first bus bar and the second bus bar, need to be prepared, so it requires time and effort to manufacture the controller. In addition, the controller may be arranged in a narrow space, such as the front of a vehicle cabin, so it is desirable to reduce the size of the controller as much as possible.

SUMMARY OF THE INVENTION

The invention provides a controller in which a bus bar is joined to another component by a plurality of joining methods and that reduces manufacturing time and effort and that is able to reduce its size, an electric power steering provided with the controller, a method of manufacturing a bus bar, and a method of manufacturing the controller.

A first aspect of the invention relates to a controller. The controller includes: a circuit board; a retaining member; a bus bar that has an embedded portion embedded in and retained by the retaining member and an exposed portion that is exposed from the retaining member and that is electrically connected to the circuit board; and an electrical element that has a terminal connected to the exposed portion. The bus bar is formed in such a manner that a metal plate of which an outer surface is plated with a plating layer is cut along a predetermined cutting plane. The cutting plane at the exposed portion has a parallel portion that is arranged substantially parallel to a principal surface of the circuit board. The parallel portion and the terminal are joined to each other.

According to the above aspect, the outer surface of the bus bar has front and back surfaces formed of a plating layer and a cutting plane (side surface) from which the metal plate is exposed. With the above configuration, a joining method suitable for joining to a plating layer, such as wire bonding, may be applied to joining a component to the plating layer. In addition, a joining method suitable for joining to metal, such as resistance welding, may be applied to joining a component to the cutting plane. In addition, the bus bar just needs to have a simple structure that the metal plate of which the outer surface is plated with the plating layer is cut along a predetermined cutting plane, so it does not require manufacturing time and effort. For example, when a metal plate is formed into the shape of a bus bar and then only part of the outer surface of the metal plate is plated with a plating layer, it is necessary that a portion not plated with the plating layer is covered with a masking material during plating and then the masking material is peeled off after plating. In contrast to this, according to the above aspect, the metal plate plated with the plating layer, in advance is cut to form the bus bar, so no masking is required. Thus, it does not require time and effort for manufacturing the bus bar, so manufacturing cost may be reduced. Furthermore, the parallel portion of the cutting plane is arranged parallel to the principal surface of the circuit board. With the above configuration, the terminal may be arranged parallel to the principal surface of the circuit board. Thus, in comparison with the case where the terminal is arranged in a perpendicular direction perpendicular to the principal surface of the circuit board, the length occupied by the terminal in the perpendicular direction may be considerably reduced. Thus, according to the above aspect, the size of the controller may be reduced.

According to the above aspect, the electric power steering may be reduced in size with less manufacturing time and effort. For example, when the controller is arranged in a narrow space under a dashboard or near a bulkhead of an engine room, the size reduction of the controller significantly contributes to increasing the flexibility of layout of the electric power steering.

A second aspect of the invention relates to an electric power steering. The electric power steering includes: the controller according to the first aspect; and an electric motor that is controlled by the controller.

A third aspect of the invention relates to a method of manufacturing a bus bar. The method includes: plating an outer surface of a metal plate formed in a strip shape; cutting the plated metal plate into a predetermined length; and bending the metal plate.

A fourth aspect of the invention relates to a method of manufacturing a controller that includes: a circuit board; a retaining member; a bus bar that has an embedded portion embedded in and retained by the retaining member and an exposed portion that is exposed from the retaining member and that is electrically connected to the circuit board; and an electrical element that has a terminal connected to the exposed portion. The method of manufacturing the controller includes: producing the bus bar by cutting a metal plate of which an outer surface is plated with a plating layer along a predetermined cutting plane; arranging the cutting plane at the exposed portion substantially parallel to a principal surface of the circuit board; and joining the cutting plane and the terminal to each other.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
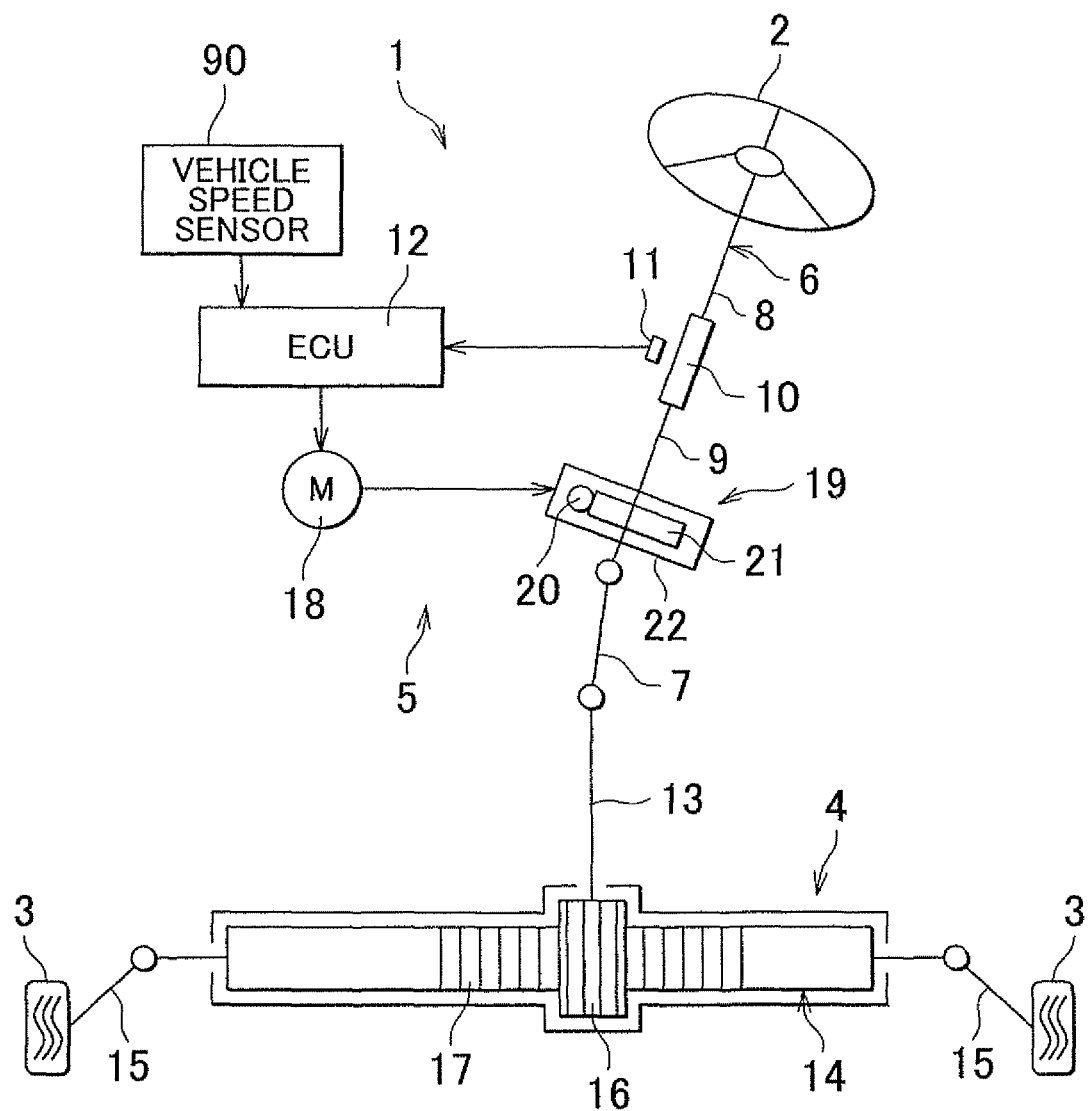
FIG. 1 is a diagram that shows the schematic configuration of an electric power steering according to an embodiment of the invention.

Hereinafter, an embodiment of the invention will be specifically described with reference to the accompanying drawings. FIG. 1 is a diagram that shows the schematic configuration of an electric power steering 1 according to an embodiment of the invention. As shown in FIG. 1, the electric power steering 1 includes a steering wheel 2, a steering mechanism 4 and a steering assist mechanism 5. The steering wheel 2 serves as a steering member. The steering mechanism 4 steers steered wheels 3 in synchronization with the rotation of the steering wheel 2. The steering assist mechanism, 5 is used to assist a driver in steering operation. The steering wheel 2 is mechanically coupled to the steering mechanism 4 via a steering shaft 6 and an intermediate shaft 7.

In the present embodiment, the description will be made on the basis of an example in which the steering assist mechanism 5 applies assist force (steering assist force) to the steering shaft 6. However, the aspect of the invention may be applied to a structure that the steering assist mechanism 5 applies assist force to a pinion shaft (described later) or a structure that the steering assist mechanism 5 applies assist force to a rack shaft (described later). The steering shaft 6 includes an input shaft 8 and an output shaft 9. The input shaft 8 is coupled to the steering wheel 2. The output shaft 9 is coupled to the intermediate shaft 7. The input shaft 8 is relatively rotatably coupled to the output shaft 9 via a torsion bar 10 along the same axis.

A torque sensor 11 is arranged around the steering shaft 6. The torque sensor 11 detects a steering torque applied to the steering wheel 2 on the basis of the amount of relative rotational displacement between the input shaft 8 and the output shaft 9. The steering torque detected by the torque sensor 11 is input to an electronic control unit (ECU) 12. The ECU 12 serves as a controller. In addition, a vehicle speed detected by a vehicle speed sensor 90 is input to the ECU 12. The intermediate shaft 7 couples the steering shaft 6 to the steering mechanism 4.

The steering mechanism 4 is formed of a rack-and-pinion mechanism. The rack-and-pinion mechanism includes a pinion shaft 13 and a rack shaft 14. The rack shaft 14 serves as a steered shaft. Each steered wheel 3 is coupled to a corresponding one of the end portions of the rack shaft 14 via a tie rod 15 and a knuckle arm (not shown). The pinion shaft 13 is coupled to the intermediate shaft 7. The pinion shaft 13 rotates in synchronization with the steering operation of the steering wheel 2. A pinion 16 is provided at the distal end (lower end in FIG. 1) of the pinion shaft 13.

The rack shaft 14 extends in a straight line in a transverse direction of an automobile. A rack 17 is formed in the middle of the rack shaft 14 in the axial direction. The rack 17 is in mesh with the pinion 16. The pinion 16 and the rack 17 convert the rotation of the pinion shaft 13 to the movement of the rack shaft 14 in the axial direction. By moving the rack shaft 14 in the axial direction, the steered wheels 3 may be steered.

When the steering wheel 2 is steered (rotated), the rotation is transmitted to the pinion shaft 13 via the steering shaft 6 and the intermediate shaft 7. Then, the rotation of the pinion shaft 13 is converted to the movement of the rack shaft 14 in the axial direction by the pinion 16 and the rack 17. Through the movement of the rack shaft 14 in the axial direction, the steered wheels 3 are steered. The steering assist mechanism 5 includes an electric motor 18 and a reduction mechanism 19. The electric motor 18 is used to assist in steering operation. The reduction mechanism 19 serves as a transmission mechanism and is used to transmit the output torque of the electric motor 18 to the steering mechanism 4. The reduction mechanism 19 includes a worm shaft 20 and a worm wheel 21. The worm shaft 20 serves as a drive gear. The worm wheel 21 is in mesh with the worm shaft 20, and serves as a driven gear. The reduction mechanism 19 is accommodated in a gear housing 22.

The worm shaft 20 is coupled to the rotary shaft (not shown) of the electric motor 18 via a coupling (not shown). The worm shaft 20 is driven by the electric motor 18 for rotation. In addition, the worm wheel 21 is coupled to the steering shaft 6 so as to be integrally rotatable. As the electric motor 18 drives the worm shaft 20 for rotation, the worm wheel 21 is driven by the worm shaft 20 for rotation, and then the worm wheel 21 and the steering shaft 6 integrally rotate. Then, the rotation of the steering shaft 6 is transmitted to the pinion shaft 13 via the intermediate shaft 7. The rotation of the pinion shaft 13 is converted to the movement of the rack shaft 14 in the axial direction. Through the movement of the rack shall 14 in the axial direction, the steered wheels 3 are steered. That is, when the worm shaft 2 is driven by the electric motor 18 for rotation, the steered wheels 3 are steered.

The electric motor 18 is controlled by the ECU 12. The ECU 12 controls the electric motor 18 on the basis of the steering torque detected by the torque sensor 11, the vehicle speed detected by the vehicle speed sensor 90, and the like. Specifically, the ECU 12 determines a target assist amount using a map that stores the correlation between a torque and a target assist amount for each vehicle speed and then executes control such that assist force generated by the electric motor 18 approaches the target assist amount.

Figure 2:
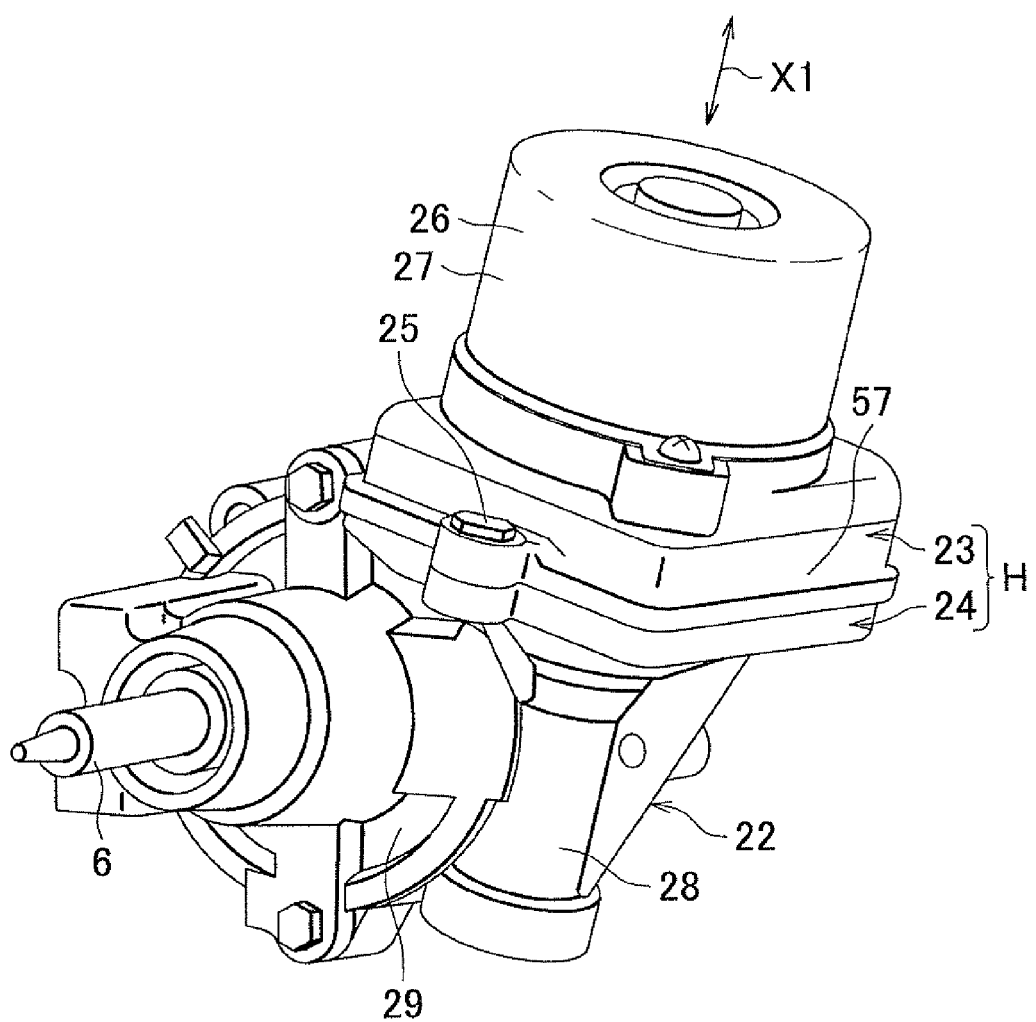
FIG. 2 is a schematic perspective view of a steering assist mechanism.

FIG. 2 is a schematic perspective view of the steering assist mechanism 5. As shown in FIG. 2, a housing H for accommodating the ECU 12 that serves as the controller is formed of a first housing 23 and a second housing 24. The first housing 23 and the second housing 24 are in contact with each other. The first housing 23 and the second housing 24 each are formed in a substantially square box shape having an opening at one end. The respective end portions of the first and second housings 23 and 24 are faced to each other and are fastened to each other by fixing bolts 25.

On the other hand, a motor housing 26 of the electric motor is formed of a cylindrical motor housing body 27 and the first housing 23. In addition, the gear housing 22 is formed of a cylindrical drive gear accommodating housing 28, a cylindrical driven gear accommodating housing 29 and the second housing 24. The drive gear accommodating housing 28 accommodates the worm shaft 20. The driven gear accommodating housing 29 accommodates the worm wheel 21.

Figure 3:
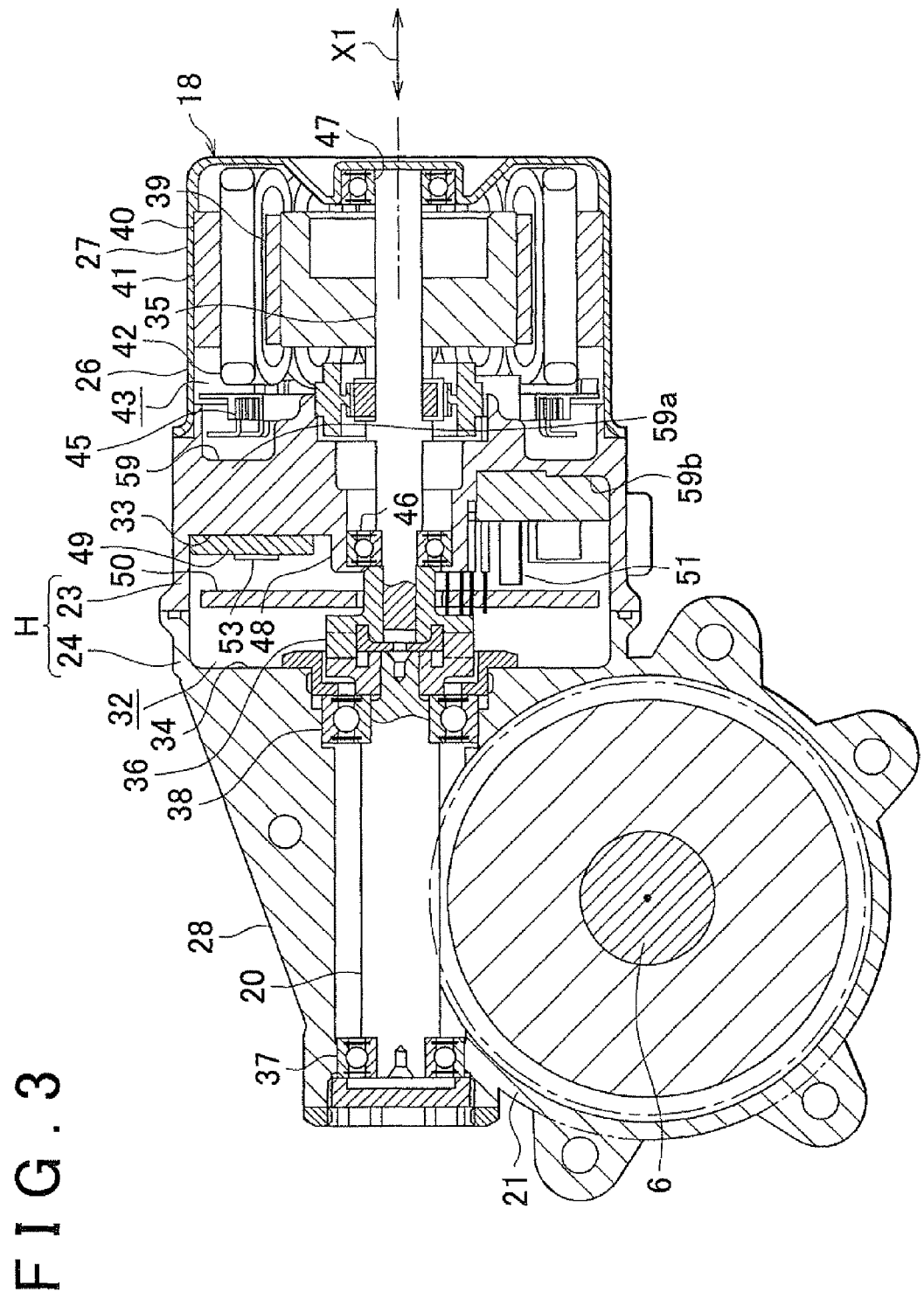
FIG. 3 is a cross-sectional view of a main portion of the electric power steering.

FIG. 3 is a cross-sectional view of a main portion of the electric power steering 1. As shown in FIG. 3, the first housing 23 and the second housing 24 form an accommodating chamber 32. The accommodating chamber 32 accommodates the ECU 12 that serves as the controller. The first housing 23 has a first inner wall surface 33 that defines part of the accommodating chamber 32. The second housing 24 has a second inner wall surface 34 that defines part of the accommodating chamber 32. These first inner wall surface 33 and second inner wall surface 34 face each other in the axial direction X1 of the rotary shaft 35 of the electric motor 18.

The rotary shaft 35 of the electric motor 18 and the worm shaft 20 are arranged along the same axis, and are coaxially coupled to each other via a coupling 36 so that power is transmittable. The worm shaft 20 is supported at both ends by the drive gear accommodating housing 28 via a first bearing 37 and a second bearing 38. The rotary shaft 35 is rotatably supported by a third bearing 46 and a fourth bearing 47. The third bearing 46 is held by the first housing 23. The fourth bearing 47 is held by the motor housing body 27.

In the present embodiment, a brushless motor is used as the electric motor 18. The electric motor 18 includes the motor housing 26, a rotor 39 and a stator 40. The rotor 39 and the stator 40 are accommodated in the motor housing 26. The rotor 39 is coupled to the rotary shaft 35 so as to be integrally rotatable. The stator 40 is fixed to the inner periphery of the motor housing body 27 of the motor housing 26. The stator 40 includes a stator core 41 and a plurality of coils 42. The stator core 41 is fixed to the inner periphery of the motor housing body 27. The stator core 41 has an annular yoke of the stator core 41 and a plurality of teeth that protrude radially inward from the inner periphery of the yoke. Each coil 42 is wound around a corresponding one of the teeth.

In addition, an annular or C-shaped bus bar 45 is accommodated in a motor chamber 43. The motor chamber 43 is defined by the motor housing body 27 of the motor housing 26 and the first housing 23. The coils 42 wound around the respective teeth are connected to the bus bar 45. The bus bar 45 is a conductive connecting material that is used at connecting portions between the coils 42 and a power board 49 (described later). The bus bar 45 functions as a power distribution member for distributing electric power from the power board 49 to the coils 42.

The first housing 23 includes a partition wall 59 as a bottom wall. The accommodating chamber 32 and the motor chamber 43 are separated by the partition wall 59. The partition wall 59 has the first inner wall surface 33. In addition, a cylindrical portion 48 is formed to extend from the partition wall 59 toward the second housing 24. An outer ring of the third bearing 46 is held by the inner periphery of the cylindrical portion 48. The power board 49 and a control board 50 are accommodated and held in the accommodating chamber 32. The power board 49 and the control board 50 constitute part of the ECU 12. At least part (for example, switching elements, such as FETs 53) of a power circuit for driving the electric motor 18 is packaged on the power board 49. The power board 49 serves as a circuit board. The bus bar 45 connected to the coils 42 is connected to the power board 49 via a bus bar terminal 51. The bus bar terminal 51 extends through the partition wall 59 of the first housing 23 into the accommodating chamber 32.

In the accommodating chamber 32, the power board 49 is arranged relatively adjacent to the first inner wall surface 33 between the first inner wall surface 33 and the second inner wall surface 34. The partition wall 59 that has the first inner wall surface 33 has a thick wall portion 59a and a thin wall portion 59b. The thick wall portion 59a is relatively thick in the axial direction X1 of the rotary shaft 35 of the electric motor 18. The thin wall portion 59b is relatively thin in the axial direction X1. The thick wall portion 59a projects into the accommodating chamber 32. The power board 49 is arranged so as to be in contact with the first inner wall surface 33 at the thick wall portion 59a. The thick wall portion 59a is a seat portion for receiving the power board 49.

In the present embodiment, the power board 49 is in contact with the first inner wall surface 33 at the thick wall portion 59a so as to be able to conduct heat, and the thick wall portion 59a functions as a heat sink for dissipating the heat of the power board 49. The control board 50 is arranged between the second inner wall surface 34 of the second housing 24 and the power board 49 in the axial direction X1 of the rotary shaft 35 of the electric motor 18. The power board 49 and the control board 50 are arranged at a predetermined interval in the axial direction X1 of the rotary shaft 35 of the electric motor 18.

Figure 4:
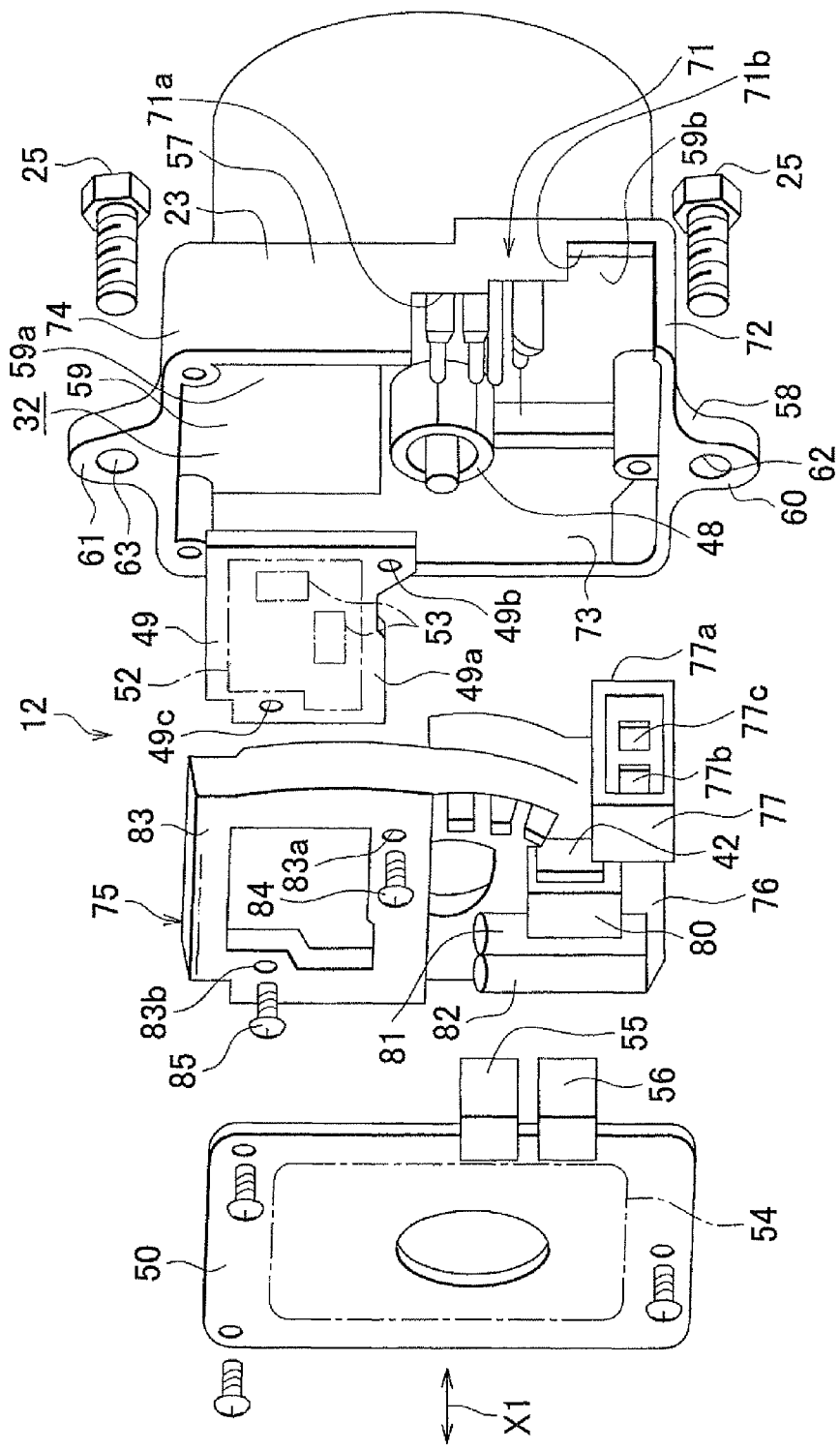
FIG. 4 is an exploded perspective view of a portion around an ECU.

Subsequently, as shown in FIG. 4 that is an exploded perspective view of a portion around the ECU 12, a power circuit 52 is packaged on the power board 49. The power circuit 52 is used to chive the electric motor 18. The power circuit 52 packaged on the power board 49 includes the plurality of FETs 53 (field effect transistors) (two FETs 53 are shown in FIG. 4). The FETs 53 serve as heat generating elements. The power board 49 is formed of a multilayer board in which electrical elements, such as the FETs 53, are packaged on a principal surface 49a. The multilayer board includes a high heat conducting plate (not shown) formed of, for example, an aluminum plate, and the high heat conducting plate is in plane contact with the thick wall portion 59a that serves as a heat sink. The principal surface 49a is a packaging, surface of the power board 49 on which the electrical elements, such as the FETs 53, are packaged.

In addition, a control circuit 54 is packaged on the control board 50. The control circuit 54 controls the power circuit 52. The control circuit 54 includes a driver and a CPU. The driver controls the FETs 53 of the power circuit 52. The CPU controls the driver. In addition, first connectors 55 and 56 are arranged at one-side edge of the control board 50. Control signals from the torque sensor 11 (see FIG. 1), and the like, are input to the control board 50 via the first connectors 55 and 56.

The first housing 23 is a substantially square box-shaped member having an opening at one end. Specifically, the first housing 23 has a substantially square annular outer peripheral wall 57, a square annular flange 58 and the partition wall 59. The flange 58 extends radially outward from one end of the outer peripheral wall 57. The partition wall 59 serves as a bottom wall. The cylindrical portion 48 is formed at the center portion of the partition wall 59 in the accommodating chamber 32. The outer peripheral wall 57 extends from the outer periphery of the partition wall 59 and surrounds the cylindrical portion 48.

The flange 58 has a plurality (a pair in the present embodiment) of bracket-shaped mounting portions 60 and 61 that protrude radially outward. The mounting portions 60 and 61 respectively have bolt insertion holes 62 and 63 that extend through the mounting portions 60 and 61 in the thickness direction. The fixing bolts 25 for fastening the first and second housings 23 and 24 are inserted through the bolt insertion holes 62 and 63.

The square annular outer peripheral wall 57 has four side walls 71 to 74. The mounting portions 60 and 61 respectively extend from the pair of facing side walls 72 and 74. In addition, the thick wall portion 59a of the partition wall 59, which functions as a heat sink, is formed continuously with the inner surface of the side wall 74 from which the mounting portion 61 extends. The side wall 71 has a cutout portion 71a. The first connectors 55 and 56 extend outward of the first housing 23 through the cutout portion 71a.

Figure 5:
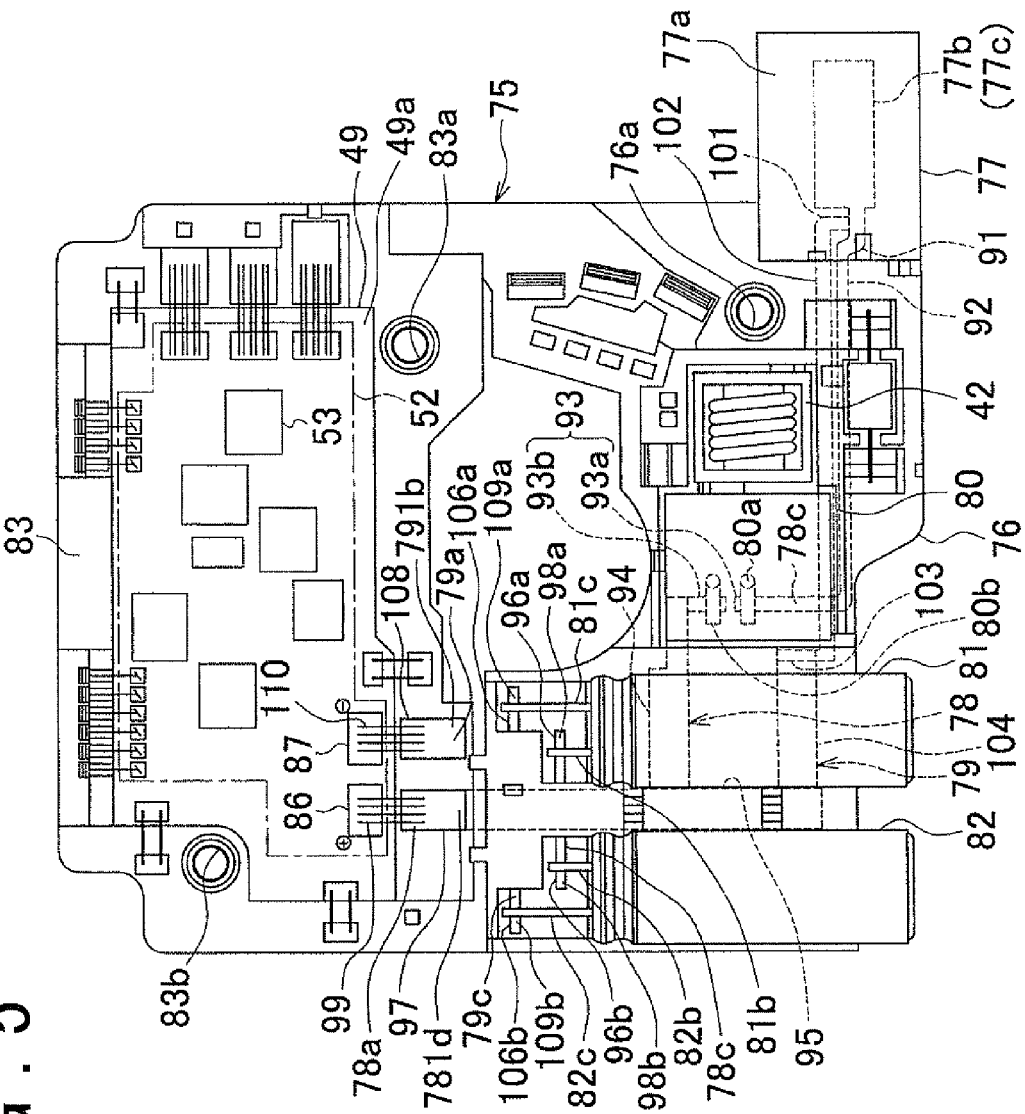
FIG. 5 is a plan view of a power board and unit.

FIG. 5 is a plan view of the power board 49 and unit 75. As shown in FIG. 4 and FIG. 5, the unit 75 is arranged between the control board 50 and the partition wall 59. The unit 75 has such a structure that various electrical elements are collectively retained by resin. With the above structure, a plurality of electrical elements may be collectively assembled to the first housing 23, so it is possible to reduce time and effort for assembling the electrical elements into the first housing 23.

The unit 75 includes a retaining member 76, a second connector 77, a first bus bar 78, a second bus bar 79, a coil 42, a relay 80, a first capacitor 81 and a second capacitor 82. The retaining member 76 is made of synthetic resin. The second connector 77 is provided on the retaining member 76. The first bus bar 78 and the second bus bar 79 are retained by the retaining member 76. The coil 42', the relay 80, the first capacitor 81 and the second capacitor 82 serve as electrical elements that are retained by the retaining member 76. The retaining member 76 has a substantially rectangular outer shape along the four side walls 71 to 74 of the first housing 23 when viewed in the axial direction X1. In addition, the retaining member 76 has such a shape that the retaining member 76 surrounds the power board 49 and the cylindrical portion 48.

The retaining member 76 has a frame portion 83 that surrounds the power board 49 when viewed in the axial direction X1. The frame portion 83 has screw insertion holes 83a and 83b. The screw insertion holes 83a and 83b are respectively arranged near the side wall 71 and near the side wall 73. In addition, the power board 49 has screw insertion holes 49b and 49c that are respectively formed at positions corresponding to the screw insertion holes 83a and 83b.

Fixing screws 84 and 85 are respectively inserted through the pairs of screw insertion holes 83a and 49b, and 83b and 49c, and are screwed into screw holes (not shown) formed in the thick wall portion 59. By screwing the fixing screws 84 and 85 into the pairs of screw insertion holes 83a and 49b, and 83b and 49c, the retaining member 76 and the power board 49 are wed to the first housing 23. In addition, the retaining member 76 has a screw insertion hole 76a at a portion adjacent to the second connector 77. A fixing screw (not shown) inserted through the screw insertion hole 76a is screwed to the thin wall portion 59b of the first housing 23.

The second connector 77 is used to connect the power board 49 to a power supply (not shown), such as a battery, and is located adjacent to the first connector 56. The second connector 77 includes a connector housing 77a and a pair of terminals 77b and 77c. The connector housing 77a is integrally formed with the retaining member 76. The pair of terminals 77b and 77c are arranged in the connector housing 77a. The connector housing 77a protrudes outward of the first housing 23 through the cutout portion 71b of the side wall 71. The terminal 77b is connected to the positive electrode of the battery (not shown) of the vehicle. The terminal 77c is grounded to the vehicle body.

Figure 6:
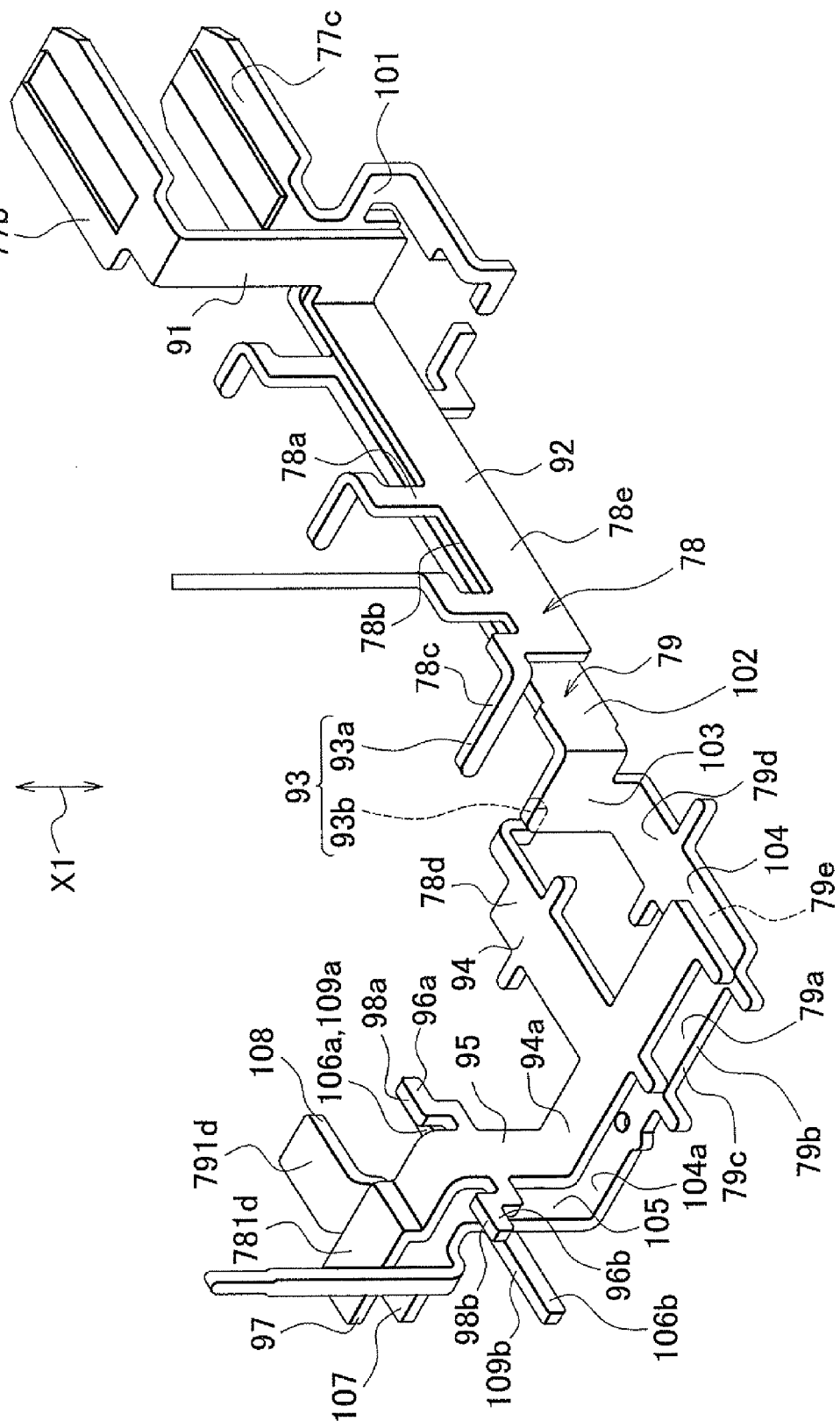
FIG. 6 is a perspective view of a first bus bar and second bus bar.

FIG. 6 is a perspective view of the first bus bar 78 and the second bus bar 79. As shown in FIG. 6, the first bus bar 78 and the second bus bar 79 each are formed in a strip shape as a whole. The first bus bar 78 is formed so that a metal plate 78b of which the outer surface is plated with a nickel plating layer 78a is cut along a predetermined cutting plane 78c and is then bent appropriately. Thus, the front surface 78d and back surface 78e of the first bus bar 78 are formed of the nickel plating layer 78a. In addition, the metal plate 78b is exposed on the cutting plane 78c that is a side surface (surface perpendicular to the front surface 78d and the back surface 78e) of the first bus bar 78.

The second bus bar 79 is formed in a similar manner to that of the first bus bar 78. Specifically, the second bus bar 79 is formed so that a metal plate 79b of which the outer surface is plated with a nickel plating layer 79a is cut along a predetermined cutting plane 79c and is then bent appropriately. Thus, the front surface 79d and back surface 79e of the second bus bar 79 are formed of the nickel plating layer 79a. In addition, the metal plate 79b is exposed on the cutting plane 79c that is a side surface (surface perpendicular to the front surface 79d and the back surface 79e) of the second bus bar 79.

Note that nickel plating is performed in such a manner that direct current or pulse current is allowed to flow through an electrolyte containing nickel ions to precipitate metal nickel on a negative electrode. As shown in FIG. 5 and FIG. 6, the majority of the first bus bar 78 and second bus bar 79 is embedded in the retaining member 76. The first bus bar 78 electrically connects the positive electrode of the battery to a positive terminal 86 formed on the power board 49. The first bus bar 78 has first to seventh portions 91 to 97. The first to fifth portions 91 to 95 are embedded in and retained by the retaining member 76. The first to fifth portions 91 to 95 serve as embedded portions. The sixth, portions 96a and 96b and the seventh portion 97 are not embedded in the retaining member 76 but exposed from the retaining member 76. The sixth portions 96a and 96b and the seventh portion 97 serve as exposed portions.

The first portion 91 is integrally formed with the terminal 77b of the second connector 77, and extends from the terminal 77b in the axial direction X1. The second portion 92 extends from one end of the first portion 91 toward the first capacitor 81 so as to be substantially perpendicular to the first portion 91. The third portion 93 extends from one end of the second portion 92 toward the power board 49 so as to be substantially perpendicular to the second portion 92.

Figure 7:
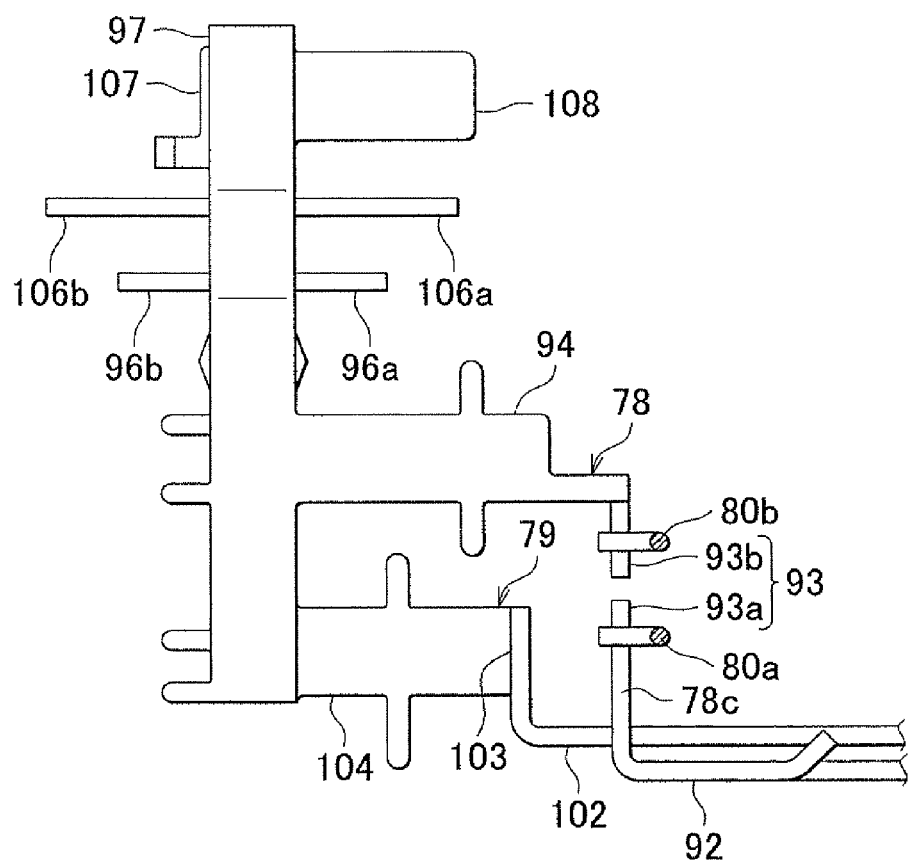
FIG. 7 is a plan view of the first bus bar and second bus bar when viewed in an axial direction.

FIG. 7 is a plan view of the first bus bar 78 and second bus bar 79 when viewed in the axial direction X1. As shown in FIG. 5 and FIG. 7, the third portion 93 is divided into a portion 93a connected to the second portion 92 and a portion 93b connected to the fourth portion 94. The relay 80 is connected to the third portion 93. The relay 80 is provided in order to interrupt current flowing through the electric motor where appropriate, and is embedded in the retaining member 76. One terminal 80a of the relay 80 is formed of a metal wire material, and is joined to the portion 93a of the third portion 93, connected to the second portion 92. In addition, the other terminal 80b of the relay 80 is formed of a metal wire material, and is joined to the portion 93b of the third portion 93, connected to the fourth portion 94. The one terminal 80a and the other terminal 80b each are joined to the cutting plane 78c of the first bus bar 78 by resistance welding, or the like.

As shown in FIG. 5 and FIG. 6, the fourth portion 94 is formed in a T shape when viewed in the axial direction X1, and is arranged parallel to the principal surface 49a of the power board 49. The fifth portion 95 is connected to one end portion 94a of the fourth portion 94 closest to the power board 49, and extends in the axial direction X1 so as to be substantially perpendicular to the fourth portion 94. The sixth portions 96a and 96b extend from both end portions of the fifth portion 95 in the width direction of the fifth portion 95.

The sixth portions 96a and 96b are exposed from the retaining member 76. The sixth portions 96a and 96b each have a crank shape. The cutting plane 78c of the first bus bar 78 includes first parallel portions 98a and 98b at the distal end portions of these sixth portions 96a and 96b. The first parallel portions 98a and 98b are parallel to each other, and are substantially parallel to the principal surface 49a of the power board 49.

The seventh portion 97 is connected to one end of the fifth portion 95, and extends toward the power board 49. The front surface 781d of the first bus bar 78 at the seventh portion 97 is formed of the nickel plating layer 78a, and is exposed from the retaining member 76. The second bus bar 79 electrically connects the negative electrode of the battery to a negative terminal 87 formed on the power board 49. The second bus bar 79 includes first to eighth portions 101 to 108. The first to fifth portions 101 to 105 and the seventh portion 107 are embedded in and retained by the retaining member 76. The first to fifth portions 101 to 105 and the seventh portion 107 serve as embedded portions. The sixth portions 106a and 106b and the eighth portion 108 are exposed from the retaining member 76. The sixth portions 106a and 106b and the eighth portion 108 serve as exposed portions.

The first portion 101 is integrally formed with the terminal 77c of the second connector 77, and is arranged parallel to the first portion 91. The second portion 102 extends from one end of the first portion 101 and is parallel to the second portion 92. The second portion 102 extends below the portion 93a of the third portion 93, connected to the second portion 92. The third portion 103 is connected to one end of the second portion 102, and is perpendicular to the second portion 102. The fourth portion 104 is formed in an L shape when viewed in the axial direction X1, and is connected to the third portion 103. The fourth portion 104 is arranged parallel to the fourth portion 94.

The fifth portion 105 is connected to one end portion 104a of the fourth portion 104 closest to the power board 49. The fifth portion 105 extends in the axial direction X1 so as to be substantially perpendicular to the fourth portion 104, and is substantially parallel to the fifth portion 95. The sixth portions 106a and 106b extend from both end portions of the fifth portion 105 in the width direction of the fifth portion 105. The sixth portions 106a and 106b are exposed from the retaining member 76. The sixth portions 106a and 106b each extend in a straight line. The cutting plane 79c of the second bus bar 79 includes second parallel portions 109a and 109b at the sixth portions 106a and 106b. The second parallel portions 109a and 109b are parallel to each other, and are parallel to the first parallel portions 98a and 98b. The second parallel portions 109a and 109b are substantially parallel to the principal surface 49a of the power board 49.

The length of each of the second parallel portions 109a and 109b is larger than the length of each of the first parallel portions 98a and 98b. In addition, the second parallel portions 109a and 109b are different in position in the axial direction X1 from the first parallel portions 98a and 98b. The seventh portion 107 is connected to one end of the fifth portion 105, and extends toward the power board 49. The eighth portion 108 extends from the seventh portion 107, and is arranged so that the position of the eighth portion 108 in the axial direction X1 coincides with the position of the seventh portion 97 in the axial direction X1. The front surface 791d of the second bus bar 79 at the eighth portion 108 is formed of the nickel plating layer 79a, and is exposed from the retaining member 76.

Figure 8A:
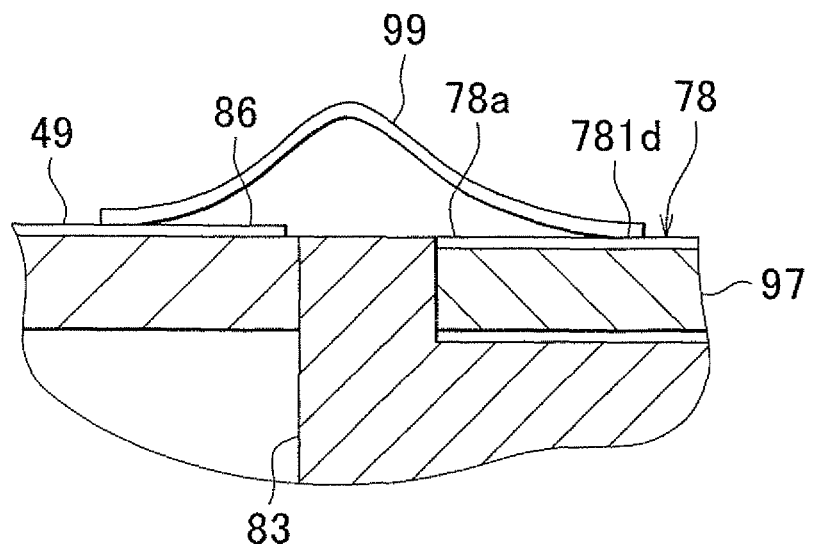
FIG. 8A is a cross-sectional view of a main portion that shows a condition where the first bus bar is connected to the power board.

FIG. 8A is a cross-sectional view of a main portion that shows a condition where the first bus bar 78 is connected to the power board 49. As shown in FIG. 8A, the first bus bar 78 is connected to the positive terminal 86 of the power board 49 by wire bonding. Specifically, one ends of a plurality of bonding wires 99 (only one bonding wire 99 is shown in FIG. 8A) are joined to the front surface 781d of the seventh portion 97 of the first bus bar 78. The front surface 781d is formed of the nickel plating layer 78a. The other ends of the bonding wires 99 are joined to the positive terminal 86 of the power board 49. By joining the bonding wires 99 in this way, the first bus bar 78 is electrically connected to the positive terminal 86 of the power board 49.

Figure 8B:
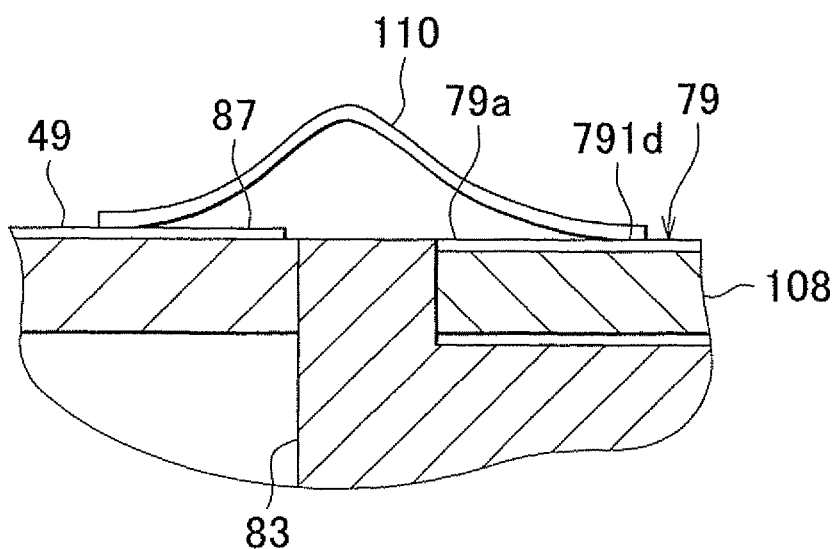
FIG. 8B is a cross-sectional view of a main portion that shows a condition where the second bus bar is connected to the power board.

FIG. 8B is a cross-sectional view of a main portion that shows a condition where the second bus bar 79 is connected to the power board 49. As shown in FIG. 8B, the second bus bar 79 is connected to the negative terminal 87 of the power board 49 by wire bonding. Specifically, one ends of a plurality of bonding wires (only one bonding wire 110 is shown in FIG. 8B) are joined to the front surface 791d of the eighth portion 108 of the second bus bar 79. The front surface 791d is formed of the nickel plating layer 79a. The other ends of the bonding wires 110 are joined to the negative terminal 87 of the power board 49. By joining the bonding wires 110 in this way, the second bus bar 79 is electrically connected to the negative terminal 87 of the power board 49.

Figure 9A:
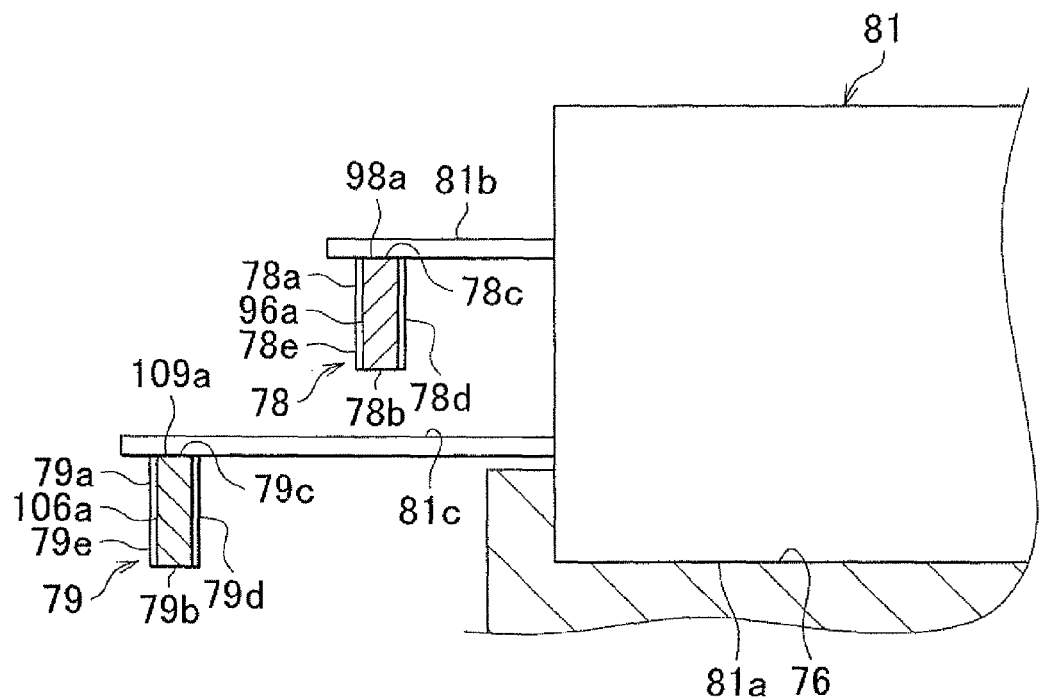
FIG. 9A is a cross-sectional view that shows a condition where a first capacitor is connected to the first and second bus bars.

FIG. 9A is a cross-sectional view that shows a condition where the first capacitor 81 is connected to the first and second bus bars 78 and 79. As shown in FIG. 5 and FIG. 9A, the first capacitor 81 and the second capacitor 82 each are used to remove ripple current that flows through the electric motor 18, and each are connected to both the first bus bar 78 and the second bus bar 79. The first capacitor 81 includes a body 81a, a first terminal 81b and a second terminal 81c. The body 81a is fixed to the retaining member 76. The first terminal 81b and the second terminal 81c are linear metal members that protrude from the body 81a and that extend parallel to the principal surface 49a of the power board 49.

The first terminal 81b is in contact with the cutting plane 78c (metal plate 78b) at the sixth portion 96a of the first bus bar 78, that is, the first parallel portion 98a, and is joined to the first parallel portion 98a by resistance welding. The second terminal 81c is in contact with the cutting plane 79c (metal plate 79b) at the sixth portion 106a of the second bus bar 79, that is, the second parallel portion 109; and is joined to the second parallel portion 109a by resistance welding.

Figure 9B:
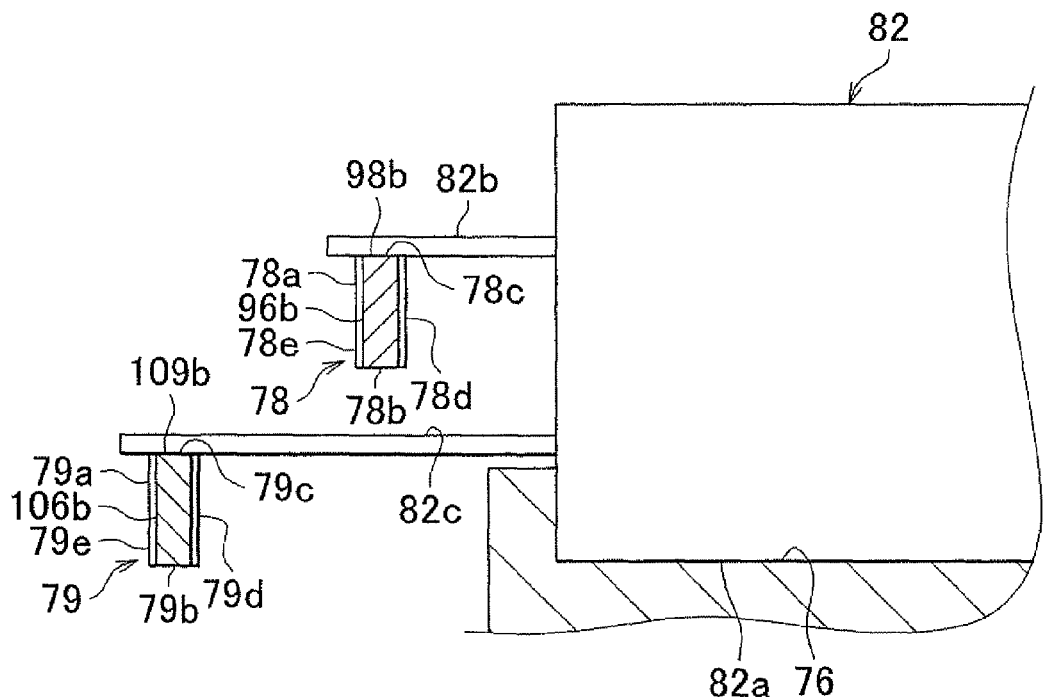
FIG. 9B is a cross-sectional view that shows a condition where a second capacitor is connected to the first and second bus bars.

Note that resistance welding is performed in such a manner that large current is allowed to flow between mutual contact portions to generate heat using resistance heat generated at the contact portions and then pressure is exerted on the contact portions. FIG. 9B is a cross-sectional view that shows a condition where the second capacitor 82 is connected to the first and second bus bars 78 and 79. As shown in FIG. 5 and FIG. 9B, the second capacitor 82 includes a body 82a, a first terminal 82b and a second terminal 82c. The body 82a is fixed to the retaining member 76. The first terminal 82b and the second terminal 82c are linear metal members that protrude from the body 82a and that extend parallel to the principal surface 49a of the power board 49.

The first terminal 82b is in contact with the cutting plane 78c (metal plate 78b) at the sixth portion 96b of the first bus bar 78, that is, the first parallel portion 98b, and is joined to the first parallel portion 98b by resistance welding. The second terminal 82c is in contact with the cutting plane 79c (metal plate 79b) at the sixth portion 106b of the second bus bar 79, that is the second parallel portion 109b, and is joined to the second parallel portion 109b by resistance welding.

As described above, according to the present embodiment, the outer surfaces of the first bus bar 78 and second bus bar 79 respectively include the front surfaces 78d and 79d, back surfaces 78e and 79e and the cutting planes 78c and 79c (side surfaces). The front surfaces 78d and 79d and the back surfaces 78e and 79e are formed of the nickel plating layer. The metal plates 78b and 79b are respectively exposed on the cutting planes 78c and 79c. A joining method suitable for joining to the nickel plating layers 78a and 79a may be applied to the nickel plating layers 78a and 79a. For example, wire bonding using the bonding wires 99 and 110 may be applied to the nickel plating layers 78a and 79a.

In addition, a joining method suitable for joining to metal may be applied to the cutting planes 78c and 79c of the first bus bar 78 and second bus bar 79. For example, resistance welding may be applied to the cutting planes 78c and 79c. The first bus bar 78 and the second bus bar 79 each just need to have a simple structure that the metal plate 78b or 79b of which the outer surface is plated with the nickel plating layer 78a or 79a is cut along the predetermined cutting plane 78c or 79c, so it does not require manufacturing time and effort.

For example, when a metal plate is formed into the shape of a bus bar and then only part of the outer surface of the metal plate is plated with a plating layer, it is necessary that a portion not plated with the plating layer is covered with a masking material during plating and then the masking material is peeled of after plating. In contrast to this, according to the present embodiment, the metal plate 78b or 79b plated with the nickel plating layer 78a or 79a in advance is cut to form the first bus bar 78 or the second bus bar 79, so no masking is required. Thus, it does not require time and effort for manufacturing the first bus bar 78 or the second bus bar 79, so manufacturing cost may be reduced.

Furthermore, the parallel portions 98a, 98b, 109a and 109b are arranged parallel to the principal surface 49a of the power board 49. Through the above arrangement, the terminals 81b and 81c of the first capacitor 81 and the terminals 82b and 82c of the second capacitor 82 may be arranged parallel to the principal surface 49a of the power board 49. Thus, in comparison with the case where the terminals 81b, 81c, 82b and 82c are arranged so as to extend in the axial direction X1 perpendicular to the principal surface 49a of the power board 49, the length occupied by the terminals 81b, 81c, 82b or 82c in the axial direction X1 may be considerably reduced. Thus, the size of the ECU 12 may be reduced.

Furthermore, the nickel plating layers 78a and 79a suitable for wire bonding are respectively formed on the first bus bar 78 and the second bus bar 79. Thus, the strength of connection between the power board 49 and the first bus bar 78 via the bonding wires 99 and the strength of connection between the power board 49 and the second bus bar 79 via the bonding wires 110 may be further increased. Furthermore, the metal plates 78b and 79b of the first bus bar 78 and second bus bar 79 may be respectively directly joined to the corresponding terminals 81b and 82b, and 81c and 82c of the capacitors 81 and 82 by resistance welding, so the strength of connection between the first bus bar 78 and the capacitors 81 and 82 and the strength of connection between the second bus bar 79 and the capacitors 81 and 82 may be further increased.

In addition, the parallel portions 98a, 98b, 109a and 109b and the corresponding terminals 81b, 82b, 81c and 82c may be overlapped in the axial direction X1 perpendicular to the principal surface 49a of the power board 49. In this condition, the first bus bar 78 and the corresponding terminals 81b and 82b are easily held between a pair of electrodes of a welding machine. Similarly, the second bus bar 79 and the corresponding terminals 81c and 82c are easily held between a pair of electrodes of a welding machine. Thus, it is easy to carry out resistance welding by allowing current to flow between the pair of electrodes of the welding machine, so it is possible to further reduce time and effort for manufacturing the ECU 12.

Furthermore, the first terminal 81b and second terminal 81c of the first capacitor 81 are respectively joined to the first parallel portion 98a of the first bus bar 78 and the second parallel portion 109a of the second bus bar 79. These parallel portions 98a and 109a are arranged parallel to the principal surface 49a of the power board 49. Thus, both the first terminal 81b and the second terminal 81c may be arranged parallel to the principal surface 49a of the power board 49.

Similarly, the first terminal 82b and second terminal 82c of the second capacitor 82 are respectively joined to the first parallel portion 98b of the first bus bar 78 and the second parallel portion 109b of the second bus bar 79. These parallel portions 98b and 109b are arranged parallel to the principal surface 49a of the power board 49. Thus, both the first terminal 82b and the second terminal 82c may be arranged parallel to the principal surface 49a of the power board 49. Thus, even when the plurality of bus bars 78 and 79 are provided, the ECU 12 may be reduced in thickness in the axial direction X1 perpendicular to the principal surface 49a of the power board 49.

Figure 10A:
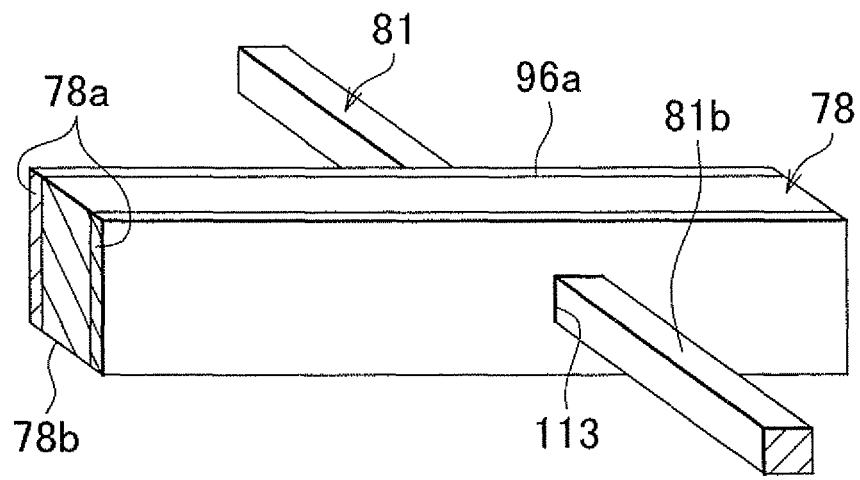
FIG. 10A is a perspective view that shows a main portion of another embodiment of the invention.
Figure 10B:
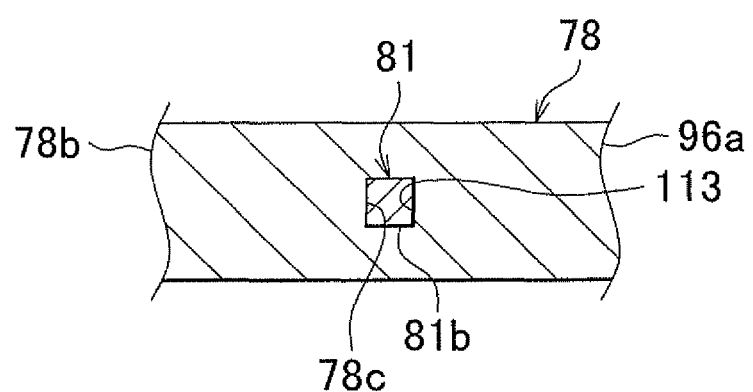
FIG. 10B is a cross-sectional view that shows a condition where a first bus bar is joined to a first terminal of a first capacitor.

In this way, the electric power steering 1 may be reduced in size with less manufacturing time and effort. The ECU 12 is arranged in a narrow space under the dashboard of the vehicle, so the size reduction of the ECU 12 significantly contributes to increasing the flexibility of layout of the electric power steering 1. The aspect of the invention is not limited to the embodiment described above; it may be modified into various forms, within the scope of the appended claims. For example, it is also applicable that, as shown in FIG. 10A and FIG. 10B, the first terminal 81b of the first capacitor 81 is inserted through a through hole 113 formed in the sixth portion 96a of the first bus bar 78 to thereby electrically connect the first terminal 81b of the first capacitor 81 to the first bus bar 78.

The inner peripheral surface of the through hole 113 formed in the first bus bar 78 includes the cutting plane 78c formed of the metal plate 78b. The first terminal 81b is inserted through the through hole 113, and is joined to the cutting plane 78c by resistance welding. The second terminal 81c of the first capacitor 81 may be joined to the second bus bar 79 in a similar manner to that of FIG. 10A and FIG. 10B. In addition, the first terminal 82b of the second capacitor 82 may be joined to the first bus bar 78 in a similar manner to that of FIG. 10A and FIG. 10B. Furthermore, the second terminal 82c of the second capacitor 82 may be joined to the second bus bar 79 in a similar manner to that of FIG. 10A and FIG. 10B.

In addition, in the above described embodiment, the nickel plating layer is illustrated as an example of a plating layer; however, the aspect of the invention is not limited to this configuration. A plating layer other than the nickel plating layer may be provided. Furthermore, capacitors are illustrated as electrical elements that are joined to the sixth portions 96a and 96b of the first bus bar 78 and the sixth portions 106a and 106b of the second bus bar 79; instead, terminals of electrical elements, other than the capacitors, may be joined to the sixth portions 96a and 96b of the first bus bar 78 and the sixth portions 106a and 106b of the second bus bar 79.

In addition, in the above described embodiment, the power board 49 is illustrated as a circuit board; however, the aspect of the invention is not limited to this configuration. The aspect of the invention may be applied to a controller that includes a circuit board, other than the power board, and a bus bar connected to the circuit board. In addition, in the above described embodiment, the aspect of the invention is applied to a so-called column assist electric power steering; however, the aspect of the invention is not limited to this configuration. The aspect of the invention may also be applied to an electric power steering of another type, such as a so-called pinion assist electric power steering and a so-called rack assist electric power steering.

In addition, in the above described embodiment, the aspect of the invention is applied to the electric power steering that outputs the power of the electric motor as steering assist force; however, the aspect of the invention is not limited to this configuration. For example, the aspect of the invention may be applied to a variable transmission ratio vehicle steering apparatus that includes a variable transmission ratio mechanism that is able to change the ratio of the steered angle of steered wheels with respect to the steering angle of a steering member and that uses the power of an electric motor for driving the variable transmission ratio mechanism, a steer-by-wire vehicle steering apparatus that releases mechanical coupling between a steering member and steered wheels and that steers the steered wheels using the power of an electric motor, or the like.

In addition, the aspect of the invention may also be applied to a general apparatus other than a vehicle steering apparatus.

While the invention has been described with reference to example embodiments thereof it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A controller comprising:
   a circuit board;
   a retaining member;
   a bus bar that has an embedded portion embedded in and retained by the retaining member and an exposed portion that is exposed from the retaining member and that is electrically connected to the circuit board; and
   an electrical element that has a terminal that extends parallel to a principal surface of the circuit board and is connected to the exposed portion,
   wherein the bus bar is formed in such a manner that a metal plate of which an outer surface is plated with a plating layer is cut along a predetermined cutting plane,
   wherein the cutting plane at the exposed portion has a parallel portion that is arranged substantially parallel to the principal surface of the circuit board, and
   wherein the parallel portion and the terminal are joined to each other.

2. The controller according to claim 1, wherein:
   the plating layer is a nickel plating layer;
   the nickel plating layer and the circuit board are connected to each other by wire bonding; and
   the parallel portion and the terminal are joined to each other by resistance welding.

3. The controller according to claim 1, wherein the metal plate is exposed on the cutting plane.

4. The controller according to claim 1, wherein the retaining member has such a shape that the retaining member surrounds at least the circuit board.

5. The controller according to claim 1, wherein:
   the bus bar includes a first bus bar connected to a positive electrode of the circuit board and a second bus bar connected to a negative electrode of the circuit board; and
   the terminal includes a first terminal and a second terminal that are respectively joined to a parallel portion of the first bus bar and a parallel portion of the second bus bar.

6. An electric power steering comprising:
   the controller according to claim 1; and
   an electric motor that is controlled by the controller.

7. The electric power steering according to claim 6, wherein the electrical element is a capacitor for removing ripple current that flows through the electric motor.

8. A method of manufacturing a controller that includes: a circuit board; a retaining member; a bus bar that has an embedded portion embedded in and retained by the retaining member and an exposed portion that is exposed from the retaining member and that is electrically connected to the circuit board; and an electrical element that has a terminal that extends parallel to a principal surface of the circuit board and is connected to the exposed portion,
   the method of manufacturing the controller comprising:
   producing the bus bar by cutting a metal plate of which an outer surface is plated with a plating layer along a predetermined cutting plane;
   arranging the cutting plane at the exposed portion substantially parallel to the principal surface of the circuit board; and
   joining the cutting plane and the terminal to each other.

* * * * *